United States Patent
Kang et al.

(10) Patent No.: US 10,402,418 B2
(45) Date of Patent: Sep. 3, 2019

(54) DISTRIBUTED PROCESSING SYSTEM FOR GRAPH QUERY LANGUAGE AND DISTRIBUTED PROCESSING METHOD FOR QUERY LANGUAGE THEREOF

(71) Applicant: Bitnine Co., Ltd., Seoul (KR)

(72) Inventors: Choelsun Kang, Incheon (KR); Kisung Kim, Seoul (KR); Kwanmo Kim, Goyang-si (KR); Kyungho Kim, Seoul (KR)

(73) Assignee: Bitnine Co. Ltd., Seoul (KR)

( * ) Notice: Subject to any disclaimer, the term of this patent is extended or adjusted under 35 U.S.C. 154(b) by 163 days.

(21) Appl. No.: 15/697,696

(22) Filed: Sep. 7, 2017

(65) Prior Publication Data

US 2018/0067997 A1    Mar. 8, 2018

(30) Foreign Application Priority Data

Sep. 7, 2016    (KR) .................. 10-2016-0115197

(51) Int. Cl.
   *G06F 17/00*   (2019.01)
   *G06F 16/248*   (2019.01)
   *G06F 16/2457*   (2019.01)
   *G06F 16/2458*   (2019.01)

(52) U.S. Cl.
   CPC ........ *G06F 16/248* (2019.01); *G06F 16/2457* (2019.01); *G06F 16/2471* (2019.01)

(58) Field of Classification Search
   CPC . G06F 16/2457; G06F 16/2471; G06F 16/248
   USPC ........................................................ 707/704
   See application file for complete search history.

(56) References Cited

FOREIGN PATENT DOCUMENTS

| KR | 2015-0104585 A | 9/2015 |
|---|---|---|
| KR | 10-1587348 B1 | 2/2016 |

*Primary Examiner* — Truong V Vo
(74) *Attorney, Agent, or Firm* — Fish & Richardson P.C.

(57) ABSTRACT

The present invention provides a distributed processing system for a graph query language and a distributed processing method for a query language thereof. The distributed processing system for a graph query language according to the present invention includes: a client configured to receive the graph query language; a server configured to receive the graph query language from the client, transmit information for query processing for the graph query language to a plurality of dispersively disposed data processing apparatuses, and integrate results of the query processings received from the data processing apparatuses to transmit the integrated results to the client; and the plurality of data processing apparatuses configured to receive the information for the query processing from the server to determine whether the query processing may be performed, and transmit the results of the query processings to the server.

6 Claims, 3 Drawing Sheets

DISTRIBUTED PROCESSING SYSTEM FOR GRAPH QUERY LANGUAGE AND DISTRIBUTED PROCESSING METHOD FOR QUERY LANGUAGE THEREOF

RELATED APPLICATIONS

This application claims priority to Korean Patent Application No. 10-2016-0115197, filed on Sep. 7, 2016 in the Korean Intellectual Property Office, the entire disclosure of which is incorporated herein by reference.

BACKGROUND OF THE INVENTION

1. Field of the Invention

The present invention relates to a distributed processing system for a graph query language and a distributed processing method for a query language thereof, and more specifically, to a distributed processing system for a graph query language capable of performing a distributed processing on a large amount of graph data, and a distributed processing method for a query language thereof.

2. Description of the Related Art

A data processing apparatus stores and processes input data, and outputs a result corresponding to a query input by a user. Particularly, when a capacity of the input data is large, various types of databases are used to increase a processing rate and obtain reliable results.

Among these databases, a graph database is optimized to process semi-structured data that do not observe a structured data model rule connected to a relational database or a different type of data table, thereby being applied to various fields such as social data, recommendation, geographic spatial analysis and the like.

A graph data model used for the above-described graph database has advantages of being able to intuitively express real-life data by a form of a graph data structure without using a table, and simply create queries without requiring a fixed schema.

However, since the graph data has a larger data volume than the structured data such as the relational data, a lot of system resources are required, thereby causing an increase in a working speed and processing costs.

As a relevant prior art, Korean Registered Patent No. 10-1587348 discloses a method for searching a cycle graph in a large amount of graph database, however, did not solve the above-described problems.

SUMMARY OF THE INVENTION

Accordingly, it is an object of the present invention to provide a distributed processing system for a graph query language capable of rapidly and efficiently processing graph data with limited resources by performing a distributed processing on the graph query language in a plurality of devices, and a distributed processing method for a query language thereof.

In addition, another object of the present invention is to provide a distributed processing system for a graph query language capable of performing rapid distributed processing even on graph data in domain areas different from each other, and a distributed processing method for a query language thereof.

Further, another object of the present invention is to provide a distributed processing system for a graph query language capable of easily processing a query language using an application program interface (API), and a distributed processing method for a query language thereof.

In order to achieve the above objects, there is provided a distributed processing system for a graph query language, including: a client configured to receive the graph query language; a server which includes an API configured to transmit and receive the query language and a result of query processing to and from the client; a data reducer configured to receive data corresponding to the result of the query processing of a plurality of data processing apparatuses, and perform data reducing including at least one of duplicated data deletion by checking duplication of the received data, data filtering according to a filtering condition defined by a user, and data materialization of connecting each data to a node and an edge of a property graph data model; and a work assignor configured to receive the query language transmitted by the client from the API and request query processing to the plurality of data processing apparatuses that are dispersively disposed, and is configured to receive the graph query language by the API from the client, transmit information for query processing for the graph query language by the work assignor to the plurality of data processing apparatuses that are dispersively disposed, and integrate results of the query processings received from the data processing apparatuses to transmit the integrated results to the client; and the plurality of data processing apparatuses which includes a graph database; and a work manager configured to receive information on the graph query language and works assigned to the data processing apparatuses from the server, transmit the received information to the graph database, and transmit information on whether the query processing is performable and the result of the query processing performed by the graph database to the server, and is configured to receive the information for the query processing for the graph query language from the server by the work manager to determine whether the query processing is performable, and transmit the results of the query processings to the server.

The client and the server, and the server and the data processing apparatuses may be configured to transmit and receive information therebetween according to a TCP protocol, respectively.

The graph query language may include a query language of the property graph data model.

Meanwhile, according to another aspect of the present invention, there is provided a distributed processing method for a query language of a distributed processing system for a graph query language, including: receiving, by a client, the graph query language; receiving, by a server, the graph query language from the client; transmitting, by the server, information for query processing for the graph query language to a plurality of data processing apparatuses that are dispersively disposed; receiving, by the data processing apparatuses which includes a graph database, and a work manager configured to receive information on the graph query language and works assigned to the data processing apparatuses from the graph database and the server, transmit the received information to the graph database, and transmit information on whether the query processing is performable and results of the query processings performed by the graph database to the server, the information for the query processing from the server to determine whether the query processing is performable; and transmitting, by the data processing apparatuses, the results of the query processings to the server if the query processing is performable, receiving, by the server, data corresponding to the results of the query processings of the data processing apparatuses, performing data reducing including at least one of duplicated data deletion by checking duplication of the received data, data filtering according to a filtering condition defined by a user, and data materialization of connecting each data to a node and an edge of a property graph data model, and integrating the results of the query processings subjected to the data reducing to transmit the integrated processing results to the client.

The client and the server, and the server and the data processing apparatuses may be configured to transmit and receive information therebetween according to a TCP protocol, respectively.

The graph query language may include a query language of the property graph data model.

In accordance with the distributed processing system for a graph query language and the distributed processing method for a query language thereof according to the present invention, it is possible to rapidly and efficiently process the graph data with limited resources.

In addition, in accordance with the distributed processing system for a graph query language and the distributed processing method for a query language thereof according to the present invention, it is possible to perform rapid distributed processing even on the graph data in domain areas different from each other.

Further, in accordance with the distributed processing system for a graph query language and the distributed processing method for a query language thereof according to the present invention, it is possible to easily process query data by the API.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a distributed processing system for a graph query language and a distributed processing method for a query language thereof according to the present invention will be described in detail with reference to the accompanying drawings.

Figure 1:
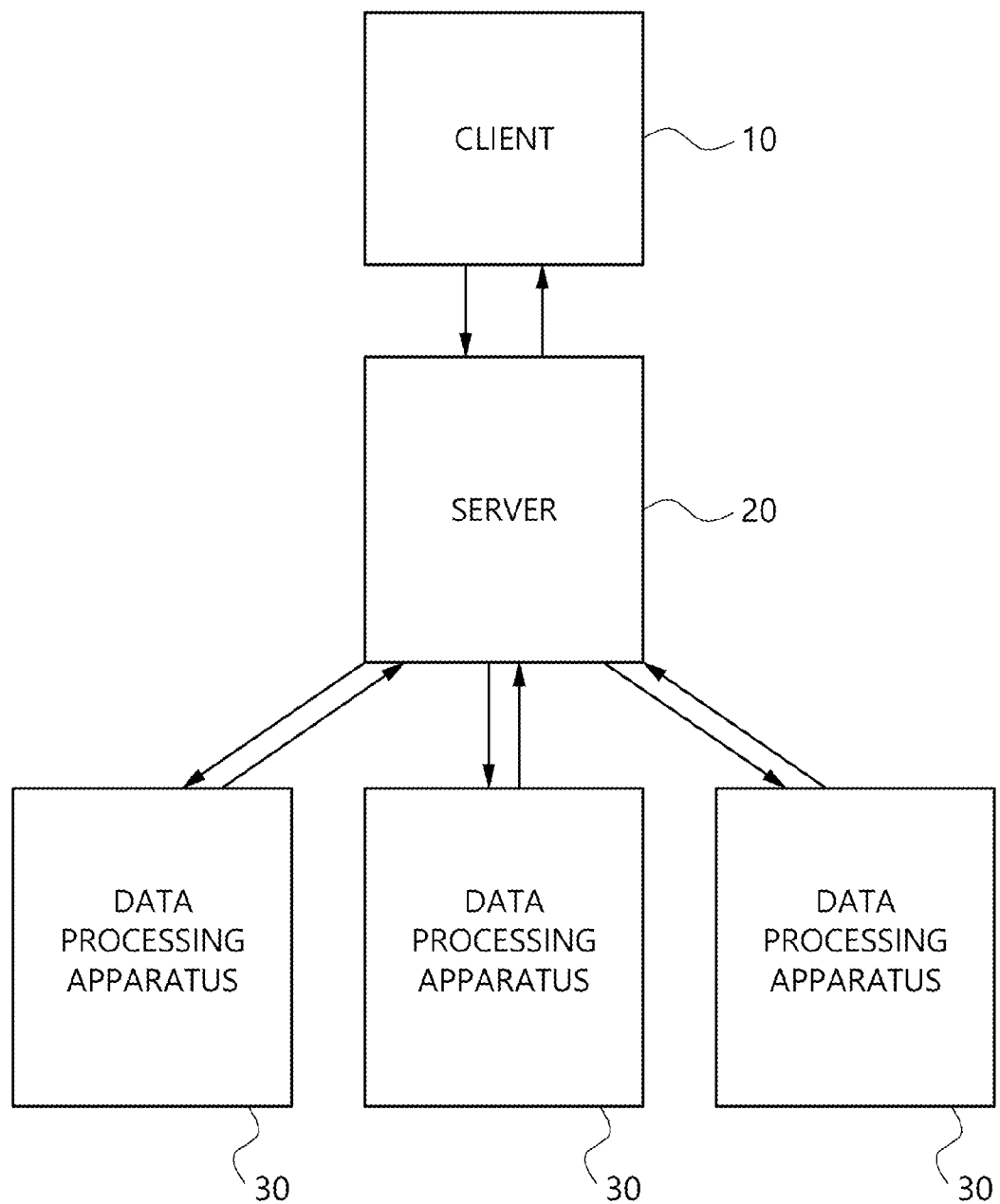
FIG. 1 is a block diagram illustrating a configuration of a distributed processing system for a graph query language according to an embodiment of the present invention.

FIG. 1 is a block diagram illustrating a configuration of a distributed processing system for a graph query language according to the present invention. As illustrated in FIG. 1, a distributed processing system 100 for a graph query language according to the present invention includes at least one client 10, a server 20, and a plurality of data processing apparatuses 30a, 30b, . . . and 30n that are dispersively disposed.

The client 10 is configured to transmit a request from a user for performing a service provided from the server 20, and to this end, receive a graph query language from the user to transmit the received graph query language to the server 20. The client 10 according to the present invention may be implemented by a personal computer, a notebook computer, a tablet PC, a smartphone, or the like that includes an input unit for inputting the query language, and a communication unit for transmitting and receiving information to and from the server 20.

The server 20 is configured to receive the graph query language from the client 10, assign a work for query processing of the graph query language, and transmit information on the graph query language and the assigned work to the data processing apparatuses 30.

The plurality of data processing apparatuses 30 provided in the system are dispersively disposed by being physically or logically divided, and are configured to receive the information on the graph query language and the work assigned by the server 20 from the server 20 to perform the query processing, and transmit a result of the query processing to the server 20.

The data processing apparatuses 30 according to the present invention perform the distributed processing in a graph database storing data by using a property graph model which uses a node and an edge unlike the conventional relational database storing data in a table form.

When data are distributed and stored in relational databases different from each other, a large amount of system resources is required to search, process, and store the distributed data, and if structures of the databases in which the data are distributed and stored are different from each other, it is difficult to perform uniform processing.

Compared to this, since the data processing apparatuses 30 according to the present invention use the graph database in which the data are processes as one object having a node and an edge regardless of a form of data, it is possible to easily connect the data distributed and stored to be integrally processed, and thereby achieving high flexibility and expandability.

Further, in order to increase versatility and uniformity, the client 10 and the server 20, and the server 20 and the data processing apparatuses 30 are configured to transmit and receive information therebetween according to a TCP protocol, respectively.

Figure 2:
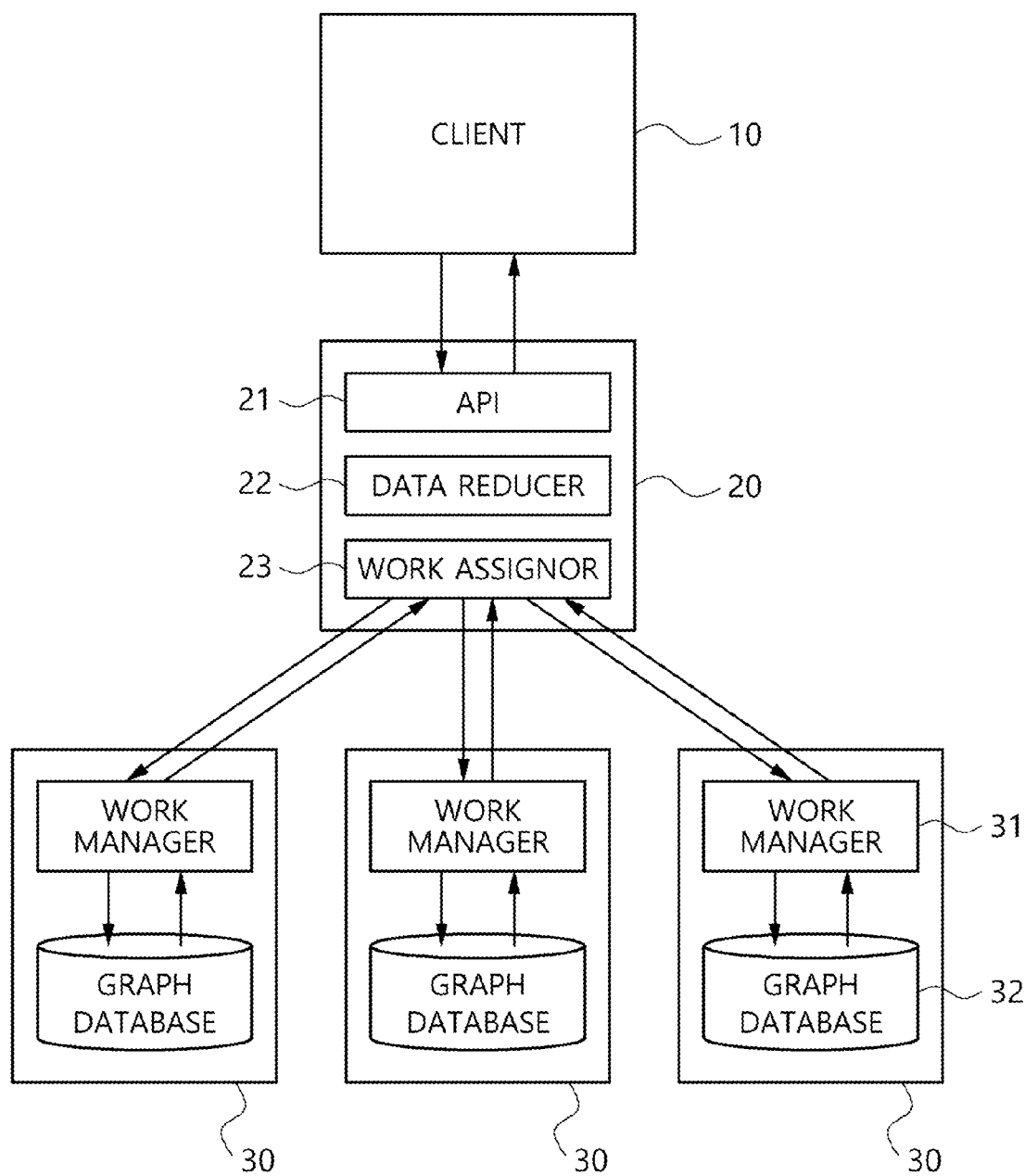
FIG. 2 is a block diagram illustrating a detailed configuration of a server and data processing apparatuses of the distributed processing system for a graph query language according to the embodiment of the present invention.

FIG. 2 is a block diagram illustrating a detailed configuration of the server 20 and the data processing apparatuses 30 of the distributed processing system for a graph query language according to the embodiment of the present invention. As illustrated in FIG. 2, the server 20 of the distributed processing system for a graph query language according to the embodiment of the present invention includes an application program interface (API) 21, a data reducer 22, and a work assignor 23.

The API 21 transmits and receives the query language and the result of the query processing from and to the client 10. The user may easily request processing of graph data through the client 10 by using the API 21 according to the present invention.

The API for graph query processing includes a framework self-supporting API provided by each graph database, a blueprint API that is a common Java API and the like. Herein, it is preferable that the server 20 according to the present invention uses a cypher as a query language for processing the graph data for a property graph model, and it is possible to provide a communication message API that allows the user to easily write a message including a header and a body text.

The data reducer 22 is configured to receive the data processed by the data processing apparatuses 30, delete duplicated data, perform filtering according to a filtering condition defined by the user, and perform data materialization of integrating the data subject to the query processing to transmit the data to the client 10.

The work assignor 23 is configured to receive the query language transmitted by the client 10 from the API 21 and request query processing to at least one of the plurality of data processing apparatuses 30a, 30b, . . . and 30n that are dispersively disposed. Herein, the work assignor 23 according to the present invention receives hardware information on the plurality of data processing apparatuses 30a, 30b, . . . and 30n and information on a query processing situation from the data processing apparatuses 30 with a predetermined time interval, and when a query for requesting the query processing is received from the client 10, transmits the corresponding query by designating a data processing apparatus 30 that can most rapidly perform the query processing.

Meanwhile, the data processing apparatuses 30 according to the present invention further include a work manager 31 and a graph database 32, respectively.

The work manager 31 is configured to receive information on the graph query language and a work assigned to the corresponding data processing apparatus 30 from the server 20, and transmit the received information to the graph database 32. Further, the work manager 31 transmits the result of the query processing executed by the graph database 32 to the server 20.

Herein, a structure of request and response messages which are transmitted and received between the work manager 31 and the work assignor 23 in the server 20 according to the present invention includes a header and a body text. The header includes metadata of the request and response messages, and the metadata includes data such as an identification number (ID) for distinguishing the request and response, a length of the body text, whether the query processing request is normally processed, a work classification tag and the like.

Further, the body text included in the request and response messages includes the graph query language for the query processing requested by the client 10 and the result of the query processing for the corresponding query language.

That is, the work assignor 23 in the server 20 transmits the graph query language that needs to be commonly processed to the work manager 31 of each of the data processing apparatuses 30a, 30b, . . . and 30n by the request from the client 10, and the work manager 31 receives the transmitted graph query language to determine whether the graph database 32 may process the transmitted query language. In this case, if the transmitted query language may be processed by the graph database 32, the work manager 31 transmits the processing result in a form of the response message to the server 20, and if the transmitted query language may not be processed by the graph database 32, the work manager 31 transmits the header containing a state value to the server 20.

Thereby, in accordance with the distributed processing system for a graph query language according to the present invention, it is possible to rapidly and efficiently process the graph data with limited resources, and achieve high flexibility and expandability.

Figure 3:
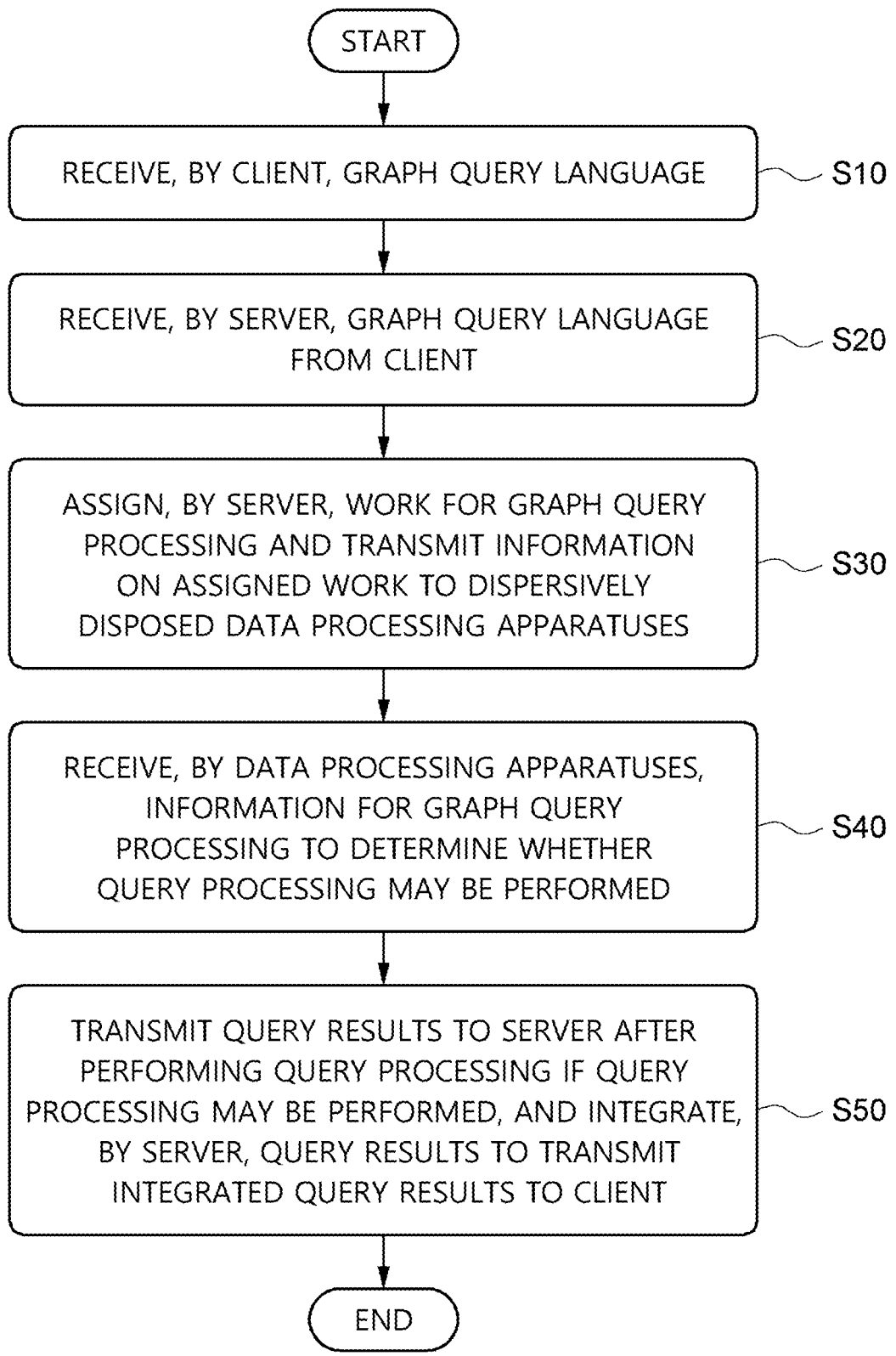
FIG. 3 is a flowchart illustrating a distributed processing method for a query language of the distributed processing system for a graph query language according to the embodiment of the present invention.

Hereinafter, a distributed processing method for a query language of the distributed processing system for a graph query language according to the present invention will be described with reference to FIG. 3.

First, the client 10 receives a graph query language (S10). The graph query language input by the client 10 is preferably a cypher that is a query language of a property graph data model for processing the graph data.

Next, the server 20 receives the graph query language from the client 10 (S20). Herein, the API 21 in the server 20 may receive the query language from the client 10 and the work assignor 23 in the server 20, and receive the query language transmitted by the client 10 from the API 21.

Further, the server 20 assigns a work for query processing for the graph query language, and transmits information on the graph query language and the assigned work to each of the data processing apparatuses 30a, 30b, . . . and 30n that are dispersively disposed (S30), and the data processing apparatuses 30 receive the information on the graph query language and the assigned work from the server 20 to determine whether the query processing may be performed (S40).

If the query processing may be performed, the data processing apparatuses 30 perform the query processing and transmit the result thereof to the server 20, respectively, and the server 20 integrates the result of the query processings and transmits the integrated result of the query processing to the client 10 (S50).

Herein, the step of transmitting the result of the query processing by the data processing apparatuses 30 and the server 20 (S50) may further include a step of performing, by the data reducer 22 in the server 20, at least one of duplicated data deletion by checking duplication of the data received from the data processing apparatuses 30, data filtering and data materialization, and a step of transmitting, by the API 21, a processing result subject to the data reducing, to the client 10.

Herein, the data materialization is a process of connecting each data to the node and the edge of the property graph data model, there is an advantage of freely connecting and establishing a relationship therebetween due to characteristics of the graph database without a schema, by comparing with the relational database.

Thereby, in accordance with the distributed processing method for a query language of the distributed processing system for a graph query language according to the present invention, it is possible to rapidly and efficiently process the graph data with limited resources, and perform integrated processing by easily connecting the distributed and stored data, and thereby achieving high flexibility and expandability.

Although the present invention has been described with reference to the embodiments shown in the drawings, but these are merely an example. It should be understood by persons having common knowledge in the technical field to which the present invention pertains that various modifications and modifications of the embodiments may be made. And, such modifications are included in the technical protection scope of the present invention. Accordingly, the real technical protection scope of the present invention is determined by the technical spirit of the appended claims.

DESCRIPTION OF REFERENCE NUMERALS

10: client
20: server
21: API
22: data reducer
23: work assignor

30: data processing apparatus
31: work manager
32: graph database

What is claimed is:

1. A distributed processing system for a graph query language, comprising:
   a client configured to receive the graph query language;
   a server which includes an API configured to transmit and receive the query language and a result of query processing to and from the client;
      a data reducer configured to receive data corresponding to the result of the query processing of a plurality of data processing apparatuses, and perform data reducing including at least one of duplicated data deletion by checking duplication of the received data, data filtering according to a filtering condition defined by a user, and data materialization of connecting each data to a node and an edge of a property graph data model; and
      a work assignor configured to receive the query language transmitted by the client from the API and request query processing to the plurality of data processing apparatuses that are dispersively disposed, and
   is configured to receive the graph query language by the API from the client, transmit information for query processing for the graph query language by the work assignor to the plurality of data processing apparatuses that are dispersively disposed, and integrate results of the query processings received from the data processing apparatuses to transmit the integrated results to the client; and
   the plurality of data processing apparatuses which includes a graph database; and
      a work manager configured to receive information on the graph query language and works assigned to the data processing apparatuses from the server, transmit the received information to the graph database, and transmit information on whether the query processing is performable and the result of the query processing performed by the graph database to the server, and
   is configured to receive the information for the query processing for the graph query language from the server by the work manager to determine whether the query processing is performable, and transmit the results of the query processings to the server.

2. The distributed processing system for a graph query language of claim 1, wherein the client and the server, and the server and the data processing apparatuses are configured to transmit and receive information therebetween according to a TCP protocol, respectively.

3. The distributed processing system for a graph query language of claim 1, wherein the graph query language includes a query language of the property graph data model.

4. A distributed processing method for a query language of a distributed processing system for a graph query language, comprising:
   receiving, by a client, the graph query language;
   receiving, by a server, the graph query language from the client;
   transmitting, by the server, information for query processing for the graph query language to a plurality of data processing apparatuses that are dispersively disposed;
   receiving, by the data processing apparatuses which includes a graph database, and a work manager configured to receive information on the graph query language and works assigned to the data processing apparatuses from the graph database and the server, transmit the received information to the graph database, and transmit information on whether the query processing is performable and results of the query processings performed by the graph database to the server, the information for the query processing from the server to determine whether the query processing is performable; and
   transmitting, by the data processing apparatuses, the results of the query processings to the server if the query processing is performable, receiving, by the server, data corresponding to the results of the query processings of the data processing apparatuses, performing data reducing including at least one of duplicated data deletion by checking duplication of the received data, data filtering according to a filtering condition defined by a user, and data materialization of connecting each data to a node and an edge of a property graph data model, and integrating the results of the query processings subjected to the data reducing to transmit the integrated processing results to the client.

5. The distributed processing method of claim 4, wherein the client and the server, and the server and the data processing apparatuses are configured to transmit and receive information therebetween according to a TCP protocol, respectively.

6. The distributed processing method of claim 4, wherein the graph query language includes a query language of the property graph data model.

* * * * *